INVENTORS
BENJAMIN O. KAPPELMANN
AND DAVID L. DUNCAN
BY Willard S. Groen
ATTORNEY

INVENTORS
BENJAMIN O. KAPPELMANN
BY-AND-DAVID L. DUNCAN.

Willard S. Groen
ATTORNEY.

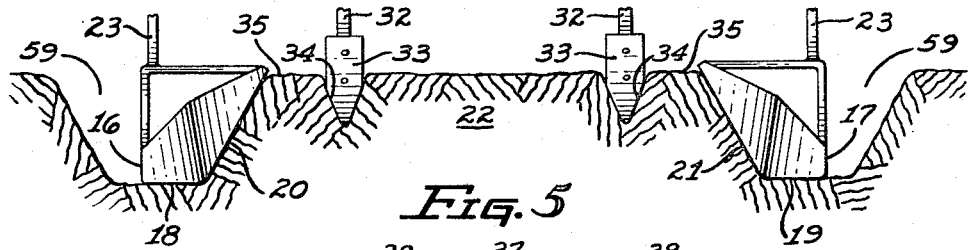
Fig. 5
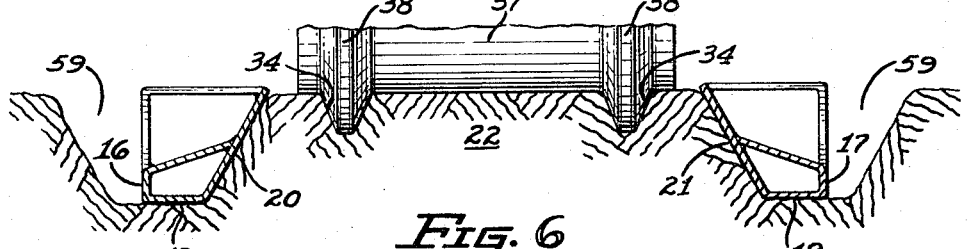
Fig. 6
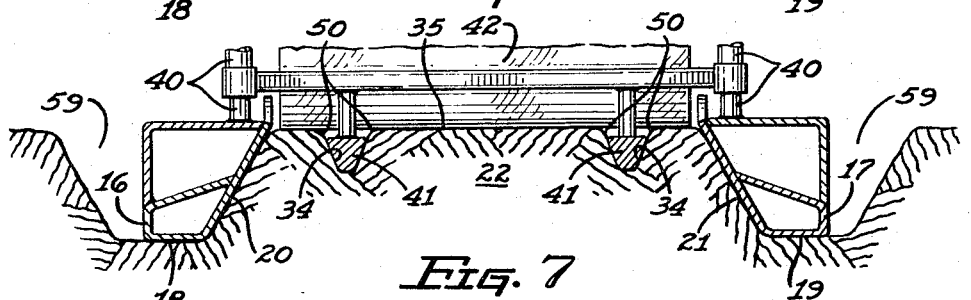
Fig. 7
Fig. 8
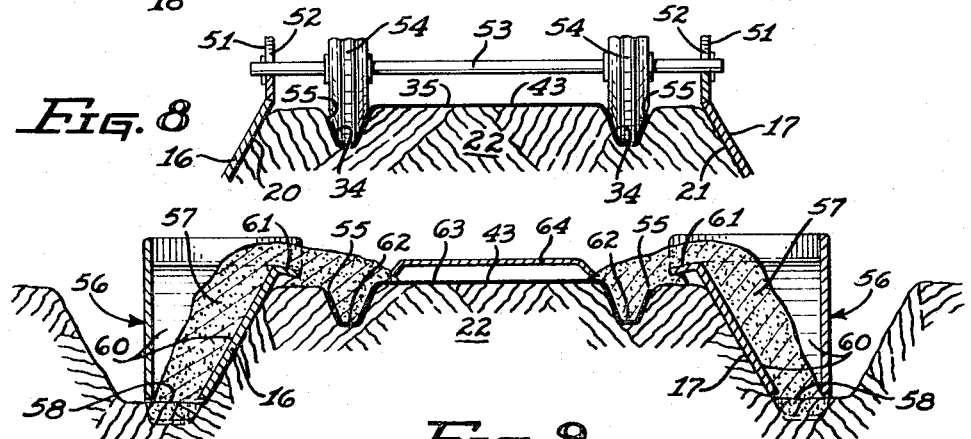
Fig. 9
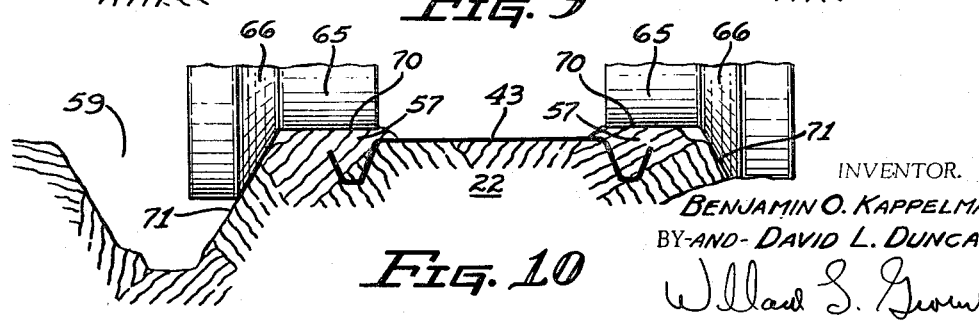
Fig. 10
INVENTOR.
BENJAMIN O. KAPPELMANN
BY-AND- DAVID L. DUNCAN.
ATTORNEY.

United States Patent Office 3,293,797
Patented Dec. 27, 1966

3,293,797
SHEET LAYING METHOD AND APPARATUS
Benjamin Oscar Kappelmann, Tempe, and David L. Duncan, Scottsdale, Ariz., assignors to Precision Agricultural Machinery Company, Phoenix, Ariz., a corporation of Arizona
Filed Apr. 1, 1965, Ser. No. 444,653
4 Claims. (Cl. 47—9)

This invention pertains to a method and apparatus for applying a plastic sheet to a plant row of a field.

This invention is related to a method and apparatus such as shown in copending application Serial No. 216,637, filed August 13, 1962.

One of the objects of this invention is to cover a plant row with a plastic sheet so as to control the growth of plants along a plant row.

Another object of this invention is to apply a plastic sheet over the planted seeds of a plant row having a plurality of longitudinally spaced perforations through which the plants grow.

An object of this invention is to provide a plastic sheet on a plant row through which the plants grow and whereby weeds and other foreign growth is eliminated and controlled.

An object is to provide a plastic mulch sheet on a plant row which holds and conserves moisture in the plant row adjacent the roots of the plants.

Another object is to provide a plastic film over a prepared and seeded plant row so as to reduce field maintenance in cultivating the rows and to prevent wind and rain erosion of the plant rows.

A further object is to provide a plastic shield over a plant row to protect seedlings from excessive rainfall, particularly in arid country irrigated fields, which might bring alkali to the surface and form crusted soil to damage and kill the seedlings during early growth.

It is also an object to provide a plastic strip for a plant row from which the fallen crop units from the plants, such as the cotton from cotton plants during initial picking, can be easily and efficiently picked up without contamination by the soil or trash in the field surface.

And it is a further object to provide a procedure and apparatus to prepare a flat-topped plant row with a stretched and secured exposed plastic sheet over a plant row through which the plants grow.

Further features and advantages of this invention will appear from a detailed description of the drawings in which:

FIG. 5 is an enlarged diagrammatic transverse section on the line 5—5 of FIG. 2.

FIG. 6 is an enlarged diagrammatic transverse section on the line 6—6 of FIG. 2.

FIG. 7 is an enlarged diagrammatic transverse section on the line 7—7 of FIG. 2.

FIG. 8 is an enlarged diagrammatic tranverse section on the line 8—8 of FIG. 2.

FIG. 9 is an enlarged diagrammatic transverse section on the line 9—9 of FIG. 2.

FIG. 10 is an enlarged diagrammatic transverse section on the line 10—10.

Figure 1:
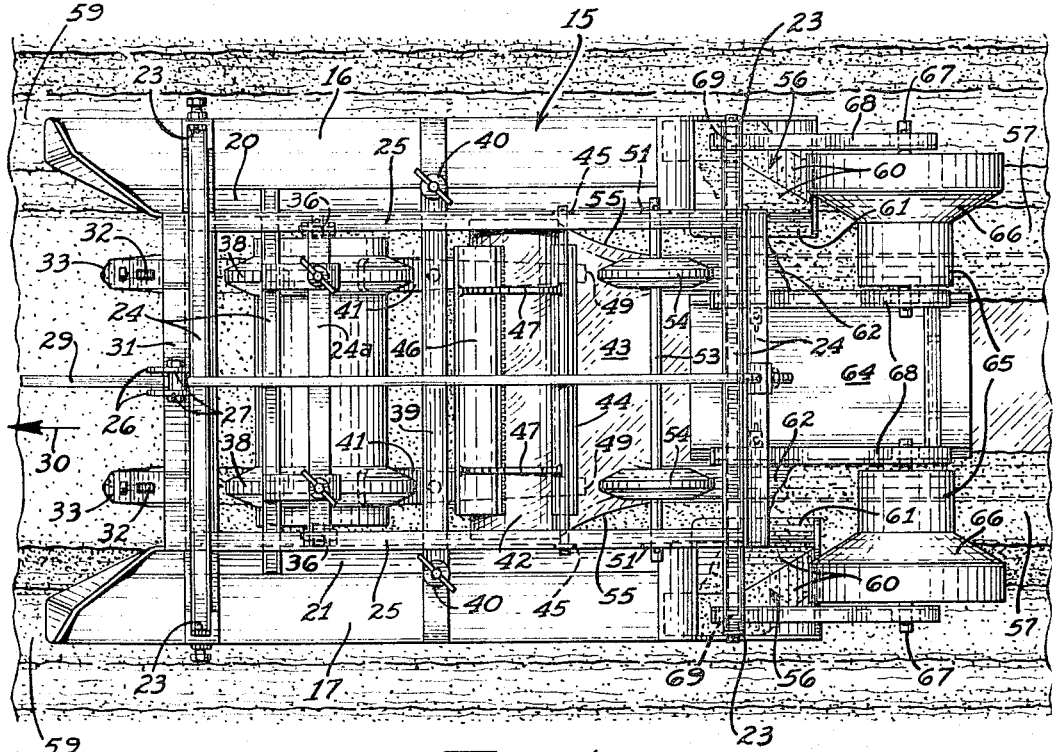
FIG. 1 is a plan view of a machine for plastic mulch sheet laying incorporating the features of this invention.

As an example of one embodiment of this invention there is shown a mulch sheet laying apparatus on a main frame 15 comprising a pair of laterally spaced parallel sled runners 16 and 17 having bottom furrow contacting surfaces 18 and 19 and upwardly converging sloping berm or plant row contacting side surfaces 20 and 21 to form the sides of the plant row and accurately laterally guide the frame 15 along the plant row berm 22. The sled runners 16 and 17 are rigidly tied together by the upright standards 23, the lateral tie bars 24, and the longitudinal tie bars 25 forming with the sled runners 16 and 17 the frame 15 of the machine.

The frame 15 has rigidly fixed thereto the brackets 26 and 27 to which are connected the usual hitch rod 28 and elevating rod 29 of a suitable tractor for towing the frame 15 on its sled runners 16 and 17 along the plant row in the direction indicated by the arrow 30. A tool bar 31 fixed to the front end of the frame 15 carries the shanks 32 on the lower ends of which are mounted the laterally spaced digger spikes 33, FIG. 5, which initially rough out the mulch sheet locking slots 34 in the top surface 35 of the plant row berm 22 as the frame 15 moves forward along the row.

Figure 2:
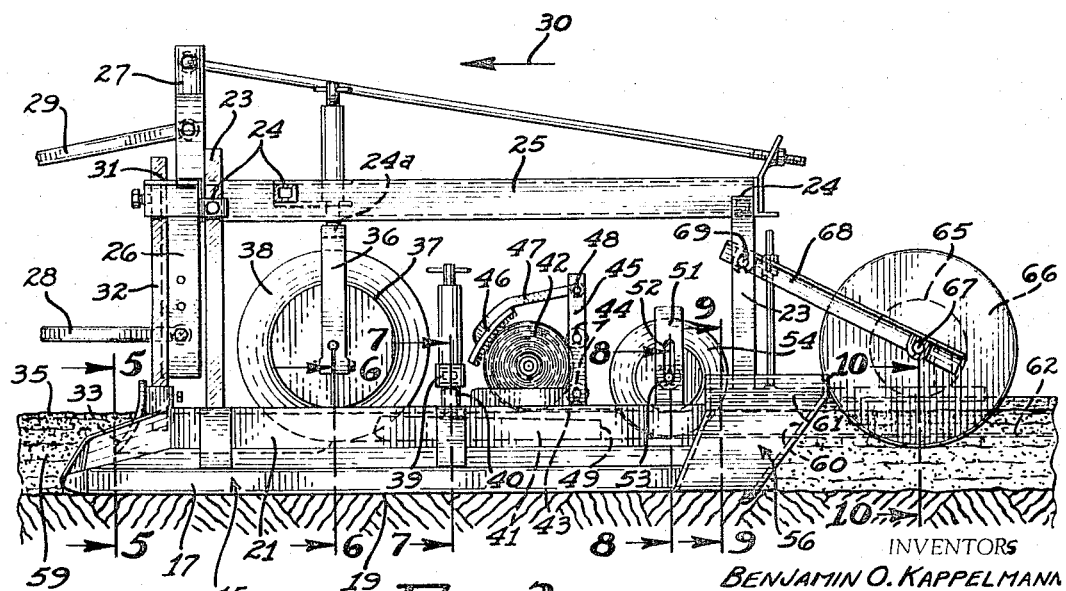
FIG. 2 is a left hand side elevation of the apparatus shown in FIG. 1.
Figure 3:
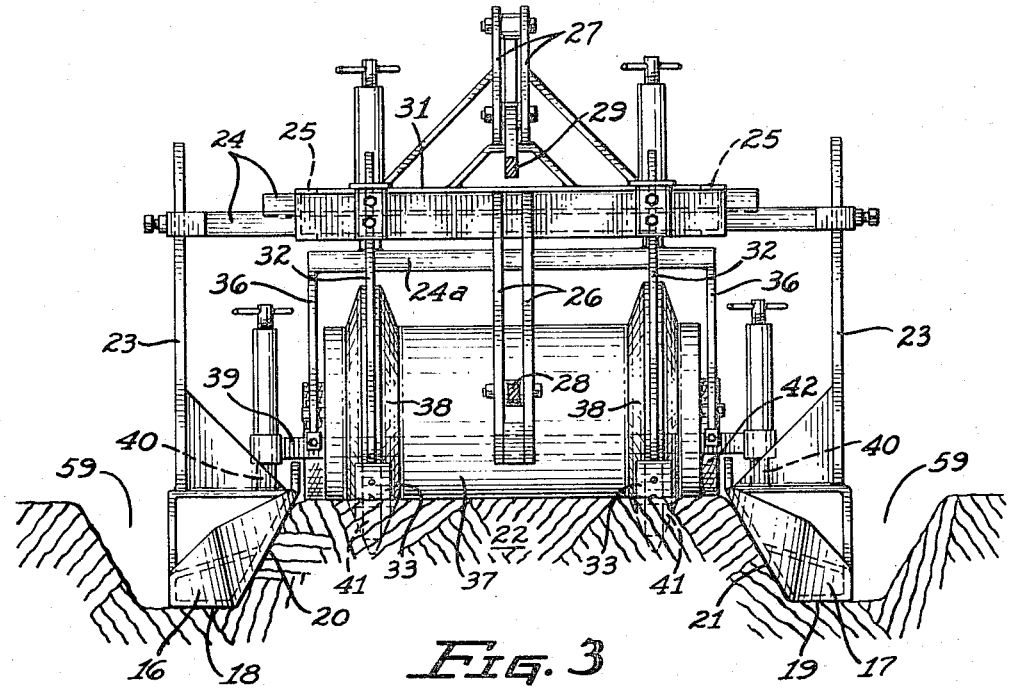
FIG. 3 is a front elevation of the machine shown in FIG. 1.

Journaled on downwardly extending support arms 36, FIGS. 2 and 6, adjustably supported on the lateral tie bars 24 and 24a is the leveling compacting and slot forming roller 37 having slot forming discs 38 on the periphery thereof so that the top surface 35 and slots 34 are initially compacted and formed to size and shape.

Fixed to the transverse member 39, FIG. 7, carried for vertical adjustment on the upright supports 40 mounted on the sled runners 16 and 17 immediately behind the roller 37 is a pair of torpedo-shaped final forming elements 41 which finally smooth and remove all clods or irregularities in the mulch sheet locking slots 34 as the mulch sheet is layed on the surface 35 of the plant row 22.

A roll 42 of mulch sheet 43, FIGS. 2 and 7, rolls upon the top surface 35 of the plant row 22 as the frame moves forward, back-up rollers 44 journaled on suitable brackets 45 fixed to the sled runners 16 and 17, serving to push and unwrap the roll 42 to lay the mulch sheet over the surface 35. A damping pressure plate 46 fixed on the support arms 47 pivotally mounted at 48 on the brackets 45 serve to maintain the roll 42 in proper contact with the ground and proper longitudinal tension in the mulch sheet 43. It is important to note that the roll 42 of mulch sheet is supported on the plant row surface 35 at a point forwardly of the rearwardly extending ends 49 of the torpedo-shaped forming elements so that any clods or soil knocked from the edges 50 of the sheet locking slots by the rolling of roll 42 on the surface 35 will be smoothed out and removed as the mulch sheet 43 is finally placed on the surface 35 of the plant row, an operation important to the final smooth and effective placement of the mulch sheet.

Suitable brackets 51, FIG. 8, fixed to the sled runners 16 and 17 have vertically disposed elongated slots 52 in which is journaled and vertically floatingly mounted the axle shaft 53 carrying a pair of locking wheels 54 rearwardly of the ends 49 of the forming elements 41 aligned with the slots 34 and adapted to roll along adjacent the edges 55 of the mulch sheet 43 to press the edges thereof into the locking slots 34 in the plant row surface so as to laterally stretch and secure the mulch sheet 43 to the surface 35 between the slots 34. In certain instances these locking wheels may be eliminated as the subsequent operations may be relied upon to secure the mulch sheet to the plant row.

Soil is then placed in the depressed edge portion of the mulch sheet in the locking slots, FIG. 9, by soil lifting elements 56 fixed to the rear ends of the sled runners 16 and 17 which scoop up soil 57 from the bottom 58 of the furrows 59 up the sloping surfaces 60 and over the inwardly projecting lips 61 into the depressed portions 62 of the edges of the mulch sheet 43 in the locking grooves 34 as the frame moves forwardly along the plant row so as to secure the mulch sheet on the plant row. If desired, in order to maintain the top surface 63 of the mulch sheet 43 free of all soil during the laying operation, a shelf shield 64 fixed on the frame 15 may be utilized to limit lifted soil passing over the lips 61 to be deposited only on the depressed portions 62 of the mulch sheet so as to facilitate further perforation and planting of the seeds through the mulch sheet intermediate the slots 34 of the plant row.

Figure 4:
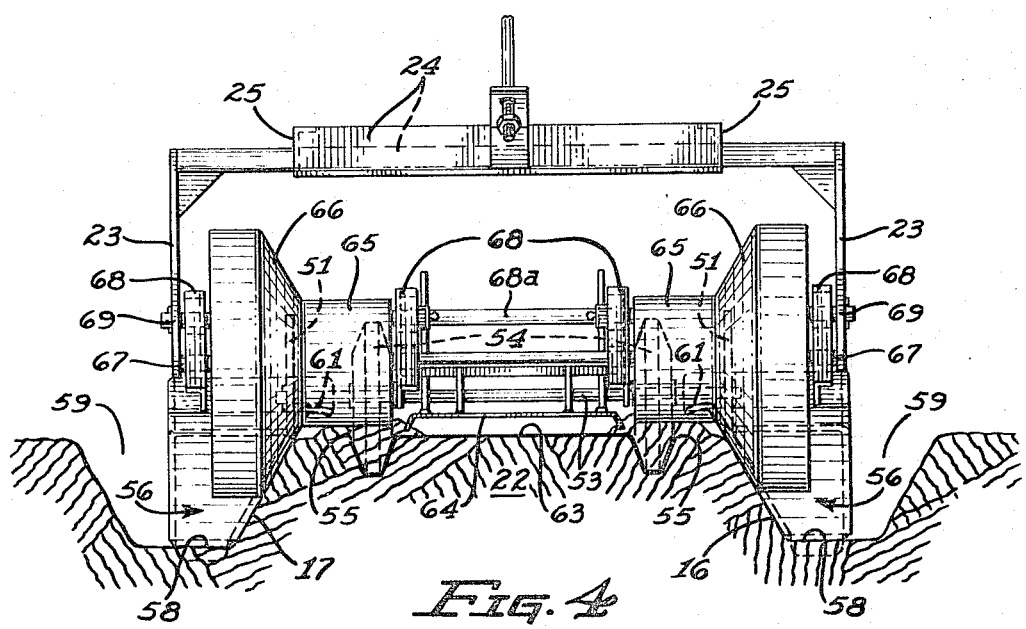
FIG. 4 is a rear elevation of the machine shown in FIG. 1.

Finally, a pair of laterally spaced compacting rollers 65 having conical flange portions 66, FIGS. 2, 4 and 10, are journaled on shafts 67 carried in the outer ends of the arms 68 which are secured to a transverse shaft 68a which is pivotally mounted at 69 on the upright standards 23 of the frame 15 so as to compact and form the soil surfaces 70 above the locking trenches 34 and over the edges 55 of the mulch sheet 43 while maintaining the size and configuration of the sloping sides 71 of the furrow 59. Thus a complete method and apparatus has been provided for accurately preparing a plant row, covering the row with a plastic mulch sheet, and securing the sheet to the plant row either before or after the plant row has been seeded.

While the apparatus herein disclosed and described constitutes a preferred form of the invention, it is also to be understood that the apparatus is capable of mechanical alteration without departing from the spirit of the invention and that such mechanical arrangement and commercial adaption as fall within the scope of the appendent claims are intended to be included herein.

Having thus fully set forth and described this invention what is claimed and desired to be obtained by United States Letters patent is:

1. A sheet laying apparatus for a plant row comprising in combination:
   (A) a frame,
   (B) a pair of laterally spaced sled runners fixed to said frame adapted to slide along and be guided by the sloping sides of the plant row,
   (C) hitch means on said frame adapted to be connected to a towing tractor,
   (D) digger spikes fixed to the front end of said frame arranged to rough out a pair of laterally spaced parallel longitudinally extending locking slots in the top surface of the plant row,
   (E) a compacting roller journaled for rotation on a horizontal transverse axis on said frame having a cylindrical portion and laterally spaced pair of slot forming discs adapted to roll along said plant row surface to compact and form said plant row surface and the locking slots therein,
   (F) means on said frame for holding a roll of sheet material in unrolling contact with said plant row surface,
   (G) means on said frame located under and extending rearwardly of said roll of sheet material sliding along in said locking slots behind said compacting roller to finally clean out and size said locking slot as said sheet of material is rolled out and spread longitudinally on said plant row surface and over said finally prepared locking slots,
   (H) and means on said frame to scoop up and lift soil from adjacent the sides of said plant row and deposit the same along the edges of said sheet of material to depress and secure said sheet edges in said locking slots.

2. A sheet laying apparatus for a plant row comprising in combination:
   (A) a frame,
   (B) a pair of laterally spaced sled runners fixed to said frame adapted to slide along and be guided by the sloping sides of the plant row,
   (C) hitch means on said frame adapted to be connected to a towing tractor,
   (D) digger spikes fixed to the front end of said frame arranged to rough out a pair of laterally spaced parallel longitudinally extending locking slots in the top surface of the plant row,
   (E) a compacting roller journaled for rotation on a horizontal transverse axis on said frame having a cylindrical portion and laterally spaced pair of slot forming discs adapted to roll along said plant row surface to compact and form said plant row surface and the locking slots therein,
   (F) means on said frame for holding a roll of sheet material in unrolling contract with said plant row surface,
   (G) means on said frame located under and extending rearwardly of said roll of sheet material sliding along in said locking slots behind said compacting roller to finally clean out and size said locking slots as said sheet of material is rolled out and spread longitudinally on said plant row surface and over said finally prepared locking slots,
   (H) locking wheels journaled on said frame behind said last mentioned means rolling along the edges of said sheet to press said edges into said locking slots,
   (I) and means on said frame behind said locking wheels to scoop up and lift soil from adjacent the sides of said plant row and deposit the same on said depressed edges of said sheet in said locking slots to secure said sheet to the plant row.

3. A sheet laying apparatus for a plant row comprising in combination:
   (A) a frame,
   (B) a pair of laterally spaced sled runners fixed to said frame adapted to slide along and be guided by the sloping sides of the plant row,
   (C) hitch means on said frame adapted to be connected to a towing tractor,
   (D) digger spikes fixed to the front end of said frame arranged to rough out a pair of laterally spaced parallel longitudinally extending locking slots in the top surface of the plant row,
   (E) a compacting roller journaled for rotation on a horizontal transverse axis on said frame having a cylindrical portion and laterally spaced pair of slot forming discs adapted to roll along said plant row surface to compact and form said plant row surface and the locking slots therein,
   (F) means on said frame for holding a roll of sheet material in unrolling contact with said plant row surface,
   (G) means on said frame located under and extending rearwardly of said roll of sheet material sliding along in said locking slots behind said compacting roller to finally clean out and size said locking slot as said sheet of material is rolled out and spread longitudinally on said plant row surface and over said finally prepared locking slots,
   (H) locking wheels journaled on said frame behind said last mentioned means rolling along the edges of said sheet to press said edges into said locking slots,
   (I) means on said frame behind said locking wheels to scoop up and lift soil from adjacent the sides of said plant row and deposit the same on said depressed edges of said sheet in said locking slots to secure said sheet to the plant row,
   (J) and compacting rollers journaled on said frame to the rear of said soil scooping and lifting means for compacting and forming the soil surface above said locking trenches and over the edges of said sheet and sizing and compacting the sloping sides of the plant row.

4. A sheet laying apparatus for a plant row comprising in combination:
 (A) a frame,
 (B) a pair of laterally spaced sled runners fixed to said frame adapted to slide along and be guided by the sloping sides of the plant row,
 (C) hitch means on said frame adapted to be connected to a towing tractor,
 (D) digger spikes fixed to the front end of said frame arranged to rough out a pair of laterally spaced parallel longitudinally extending locking slots in the top surface of the plant row,
 (E) a compacting roller journaled for rotation on a horizontal transverse axis on said frame having a cylindrical portion and laterally spaced pair of slot forming discs adapted to roll along said plant row surface to compact and form said plant row surface and the locking slots therein,
 (F) means on said frame for holding a roll of sheet material in unrolling contact with said plant row surface,
 (G) means on said frame located under and extending rearwardly of said roll of sheet material sliding along in said locking slots behind said compacting roller to finally clean out and size said locking slot as said sheet of material is rolled out and spread longitudinally on said plant row surface and over said finally prepared locking slots,
 (H) means on said frame to scoop up and lift soil from adjacent the sides of said plant row and deposit the same along the edges of said sheet of material to depress and secure said sheet edges in said locking slots,
 (I) and a shelf shield on said frame located between said scoop up and lifting devices to prevent deposit of soil on the top surface of said sheet.

References Cited by the Examiner
UNITED STATES PATENTS

| | | | |
|---|---|---|---|
| 1,787,902 | 1/1931 | Herfort | 47—9 |
| 3,020,859 | 2/1962 | Kang | 111—3 |
| 3,161,163 | 12/1964 | Cosner et al. | 111—3 |
| 3,180,290 | 4/1965 | Kappelmann et al. | 111—85 |

ABRAHAM G. STONE, *Primary Examiner.*

R. E. BAGWILL, *Assistant Examiner.*